US011124219B2

(12) United States Patent
Hansen et al.

(10) Patent No.: US 11,124,219 B2
(45) Date of Patent: Sep. 21, 2021

(54) STOWABLE VEHICLE INTERFACE

(71) Applicant: Ford Global Technologies, LLC, Dearborn, MI (US)

(72) Inventors: Cheri Lyn Hansen, Canton, MI (US); Cynthia M. Neubecker, Westland, MI (US); Brad Alan Ignaczak, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 15/996,928

(22) Filed: Jun. 4, 2018

(65) Prior Publication Data
US 2019/0367072 A1 Dec. 5, 2019

(51) Int. Cl.
*B62D 1/183* (2006.01)
*G05D 1/02* (2020.01)
(Continued)

(52) U.S. Cl.
CPC ............. *B62D 1/183* (2013.01); *B60N 2/793* (2018.02); *B60R 7/04* (2013.01); *G05D 1/021* (2013.01)

(58) Field of Classification Search
CPC ........ G05D 1/021; G05D 1/0246; B60R 7/04; B60R 11/00; B60R 11/0001; B60R 11/0003; B60R 11/0007; B60R 11/001; B60R 11/0012; B60R 11/0014; B60R 11/0019; B60R 11/0042; B60R 11/008; B60R 11/00892; B60R 11/0084; B60R 11/0085; B60R 11/0089; B60R 11/0091; B60R 25/0224; B60R 5/00; B60R 5/006; B60R 5/02; B60R 5/044; B60R 5/045; B60R 5/048; B60R 7/00; B60R 7/043; B60R 7/10; B60R 7/12; B60R 7/14; B60N 2/793; B60N 2/00; B60N 2/005; B60N 2/07; B60N 2/30; B60N 2/68; B60N 2/838; B62D 1/183; B62D 1/00; B62D 1/02;
(Continued)

(56) References Cited

U.S. PATENT DOCUMENTS 3,741,604 A * 6/1973 Heath ................. B66F 9/07563
414/470
4,223,940 A * 9/1980 Janz .......................... B60R 7/06
292/127
(Continued)

FOREIGN PATENT DOCUMENTS

CN         106627724 A     5/2017

OTHER PUBLICATIONS

Non-Final Office Action dated Apr. 11, 2019 regarding U.S. Appl. No. 15/820,532 (15 pages).

*Primary Examiner* — Anthony R Jimenez
(74) *Attorney, Agent, or Firm* — Frank A. MacKenzie; Bejin Bieneman PLC

(57) ABSTRACT

A stowable user interface system includes an armrest. The stowable user interface system includes a steering wheel support arm supported by the armrest and movable between an extended position outside the armrest and a retracted position inside the armrest. The stowable user interface system permits an operator of a vehicle to control a steering system of the vehicle when the steering wheel support arm in the extended position. The stowable user interface system stows the steering wheel support arm in the retracted position.

20 Claims, 6 Drawing Sheets

(51) Int. Cl.
  *B60R 7/04* (2006.01)
  *B60N 2/75* (2018.01)
(58) Field of Classification Search
  CPC .......... B62D 1/181; B62D 1/16; B62D 1/163;
    B62D 1/18; B62D 1/24; G05G 9/00;
    G05G 9/04; G05G 9/047; B62J 1/00;
    B62N 1/181; B62N 1/185; B62N 1/187;
    B62N 1/189; B62N 1/192; B62N 1/195;
    B62B 7/00; B62B 7/14; Y10S 180/00;
    Y10S 180/09; Y10S 180/907; A61G
    2203/14; A61G 5/00; A61G 5/047; A61G
    5/10; A61G 5/105; A61G 5/1051; H01F
    7/1844
  USPC .......................................................... 701/23
  See application file for complete search history.

(56) References Cited

U.S. PATENT DOCUMENTS

| | | | | |
|---|---|---|---|---|
| 4,372,604 A | * | 2/1983 | Raksanyi | B61D 33/005 297/162 |
| 5,172,607 A | * | 12/1992 | Wu | B60R 25/0222 180/287 |
| 6,508,508 B1 | * | 1/2003 | Bargiel | B60N 2/793 297/188.16 |
| 7,210,552 B2 | * | 5/2007 | Priepke | B62D 1/10 180/321 |
| 7,815,220 B2 | * | 10/2010 | Demmon | B62D 1/187 280/774 |
| 8,138,917 B2 | * | 3/2012 | Diener | G06Q 10/087 340/545.6 |
| 9,333,983 B2 | | 5/2016 | Lathrop et al. | |
| 9,630,644 B2 | * | 4/2017 | Soderlind | B62D 1/181 |
| 2004/0140145 A1 | | 7/2004 | Chernoff et al. | |
| 2009/0230749 A1 | * | 9/2009 | Kostak | E02F 3/325 297/411.36 |
| 2009/0321171 A1 | | 12/2009 | Hakansson | |
| 2011/0281649 A1 | * | 11/2011 | Jaouen | A63F 13/803 463/36 |
| 2015/0141157 A1 | * | 5/2015 | Sullivan | A63F 13/803 463/47 |
| 2016/0264021 A1 | | 9/2016 | Gillett | |
| 2017/0029018 A1 | | 2/2017 | Lubischer et al. | |
| 2017/0225570 A1 | * | 8/2017 | El Aile | B60R 7/06 |
| 2017/0227960 A1 | | 8/2017 | Joyce et al. | |

* cited by examiner

STOWABLE VEHICLE INTERFACE

BACKGROUND

A computer may operate a vehicle in an autonomous mode or a semi-autonomous mode. In the autonomous mode each of vehicle propulsion, braking, and steering system may be controlled by the computer. In the semi-autonomous mode the computer may control one or two of vehicles propulsion, braking, and steering system. In a non-autonomous mode, a human operator may control the vehicle propulsion, braking, and steering system. Accordingly, the operator may, or may not, need to interact with certain user input systems, e.g., a steering wheel.

DETAILED DESCRIPTION

Figure 1:
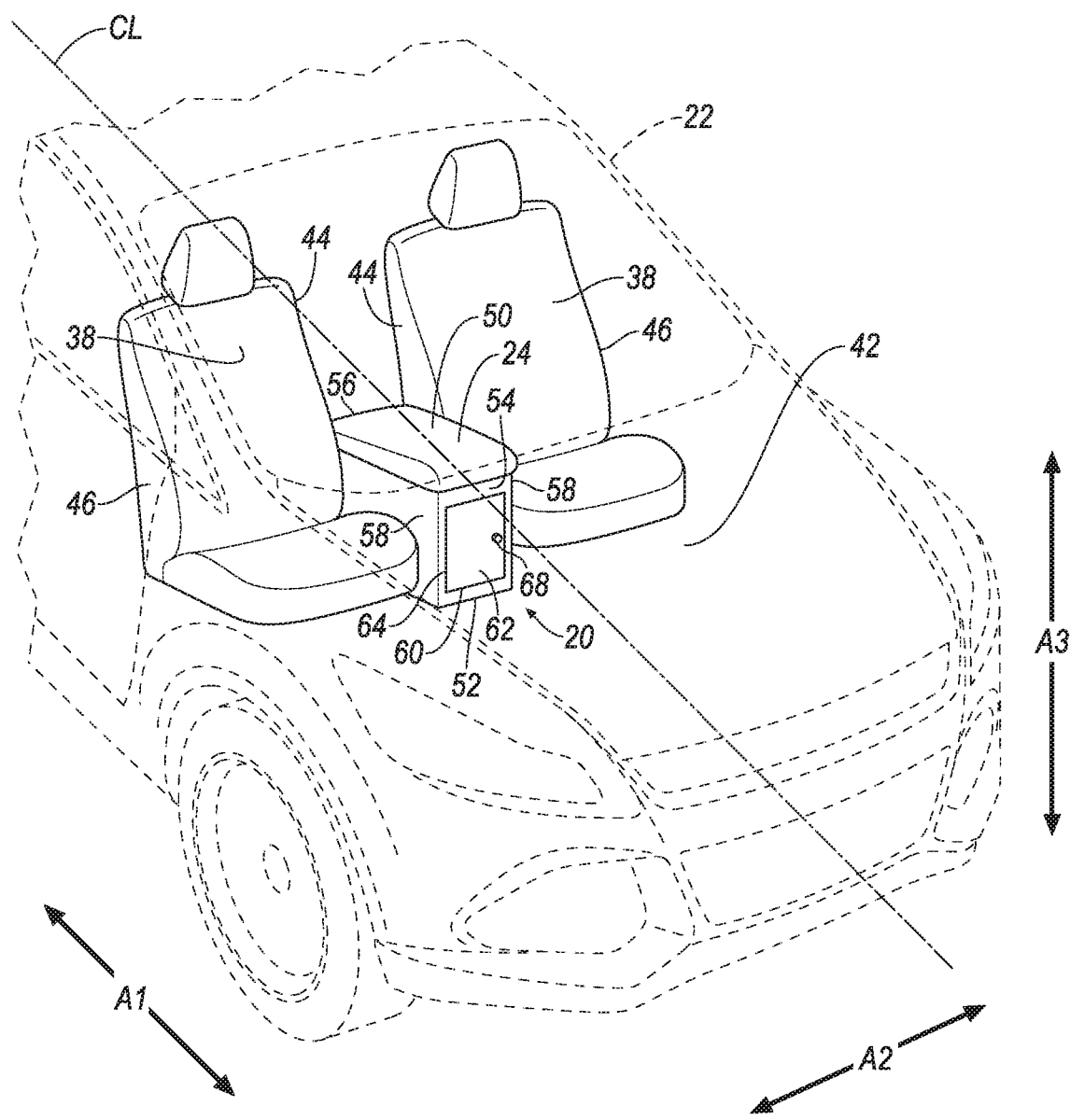
FIG. 1 is a perspective view of a vehicle having a stowable user interface system in a retracted position.

A system includes an armrest. The system includes a steering wheel support arm supported by the armrest and movable between an extended position outside the armrest and a retracted position inside the armrest.

The steering wheel support arm may be slidable along the armrest between the extended position and the retracted position.

The system may include a steering wheel supported by the steering wheel support arm.

The steering wheel support arm may include a base and an extension pivotally supported by the base.

The base may include a telescoping member.

The extension may include a telescoping member.

The armrest may include a panel movable between a closed position in which the steering wheel support arm is inhibited from moving from the retracted position to the extended position and an open position in which the steering wheel support arm is permitted to move from the retracted position to the extended position.

The system may include a lock moveable between a locked state in which the panel is inhibited from moving from the closed position to the open position and an unlocked state in which the panel is permitted to move from the closed position to the open position.

A vehicle includes a seat. The vehicle includes an armrest positioned along a cross-vehicle axis relative to the seat. The vehicle includes a steering wheel support arm supported by the armrest and movable between an extended position outside the armrest and a retracted position inside the armrest.

The vehicle may include a processor and a memory storing instructions executable by the processor to determine whether the steering wheel support arm is in the extended position or the retracted position.

The memory may store instructions executable by the processor to operate in an autonomous mode upon determining the steering wheel support arm is in the retracted position.

The memory may store instructions executable by the processor to operate in one of a semi-autonomous mode and a manual mode upon determining the steering wheel support arm is in the extended position.

The memory may store instructions executable by the processor to determine whether the steering wheel support arm is in the extended position or the retracted position based on information from a proximity sensor.

The armrest may include a panel movable between a closed position in which the steering wheel support arm is inhibited from moving from the retracted position to the extended position and an open position in which the steering wheel support arm is permitted to move from the retracted position to the extended position.

The vehicle may include a lock moveable between a locked state in which the panel is inhibited from moving from the closed position to the open position and an unlocked state in which the panel is permitted to move from the closed position to the open position.

The vehicle may include a processor and a memory storing instructions executable by the processor to actuate the lock from the locked state to the unlocked state upon receiving a request to operate in one of a semi-autonomous mode and a manual mode.

The vehicle may include a floor, the armrest supported by the floor.

The steering wheel support arm in the extended position may be in front of the seat.

The armrest may be located at a vehicle inboard side of the seat.

The armrest may be supported by the seat.

With reference to the Figures, wherein like numerals indicate like parts throughout the several views, a stowable user interface system 20 for controlling a vehicle 22 includes an armrest 24 and a steering wheel support arm 26. The steering wheel support arm 26 is supported by the armrest 24 and movable between an extended position outside the armrest 24 and a retracted position inside the armrest 24. The steering wheel support arm 26 may support a steering wheel 28.

The stowable user interface system 20 permits an operator of the vehicle 22 to control a steering system 34 of the vehicle 22 when the steering wheel support arm 26 in the extended position, e.g., the operator may interact with the steering wheel 28 to control the vehicle 22 when the steering wheel support arm 26 in the extended position. The stowable user interface system 20 stows the steering wheel support arm 26 in the retracted position, e.g., such that an occupant may have increased mobility within a passenger cabin of the vehicle 22, such that the occupant may be restricted from interacting with the steering wheel 28, etc.

The vehicle 22 may be any passenger or commercial automobile such as a car, a truck, a sport utility vehicle, a crossover vehicle, a van, a minivan, a taxi, a bus, etc. The vehicle 22 may define a longitudinal axis A1, e.g., extending between a front and rear of the vehicle 22. The vehicle 22 may define a cross-vehicle axis A2, e.g., extending between a left side and a right side of the vehicle 22. The vehicle 22 may define a vertical axis A3, e.g., extending between a top and a bottom of the vehicle 22. The longitudinal axis A1, the cross-vehicle axis A2, and the vertical axis A3 may be perpendicular to each other. The front, rear, top, bottom, left and rights sides, etc., may be relative to an orientation of the operator of the vehicle 22. The front, rear, top, bottom, left and rights sides, etc., may be relative an orientation of controls for operating the vehicle 22, e.g., an instrument panel. The front, rear, top, bottom, left and rights sides, etc., may be relative a driving direction of the vehicle 22 when wheels of the vehicle 22 are all parallel with each other, etc. The vehicle 22 may define a centerline CL that bisects the vehicle 22, e.g., elongated along the longitudinal axis A1 and midway between the right side and left side of the vehicle 22.

The vehicle 22 may operate in an autonomous mode, a semi-autonomous mode, or a manual mode. In the autonomous mode each of a propulsion system 30, a brake system 32, and the steering system 34 of the vehicle 22 are controlled by a computer 66 (all shown in FIG. 5). In the semi-autonomous mode the computer 66 may control one or two of the propulsion system 30, the brake system 32, and/or the steering system 34. In the manual mode, a human operator may control the propulsion system 30, the brake system 32, and the steering system 34, e.g., via input to the steering wheel 28, pedals of the vehicle 22, etc.

The vehicle 22 may include one or more seats 38. The seats 38 are shown as bucket seats, but alternatively the seats 38 may be a bench seat or another type of seat. The seat 38 may include a frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The seat 38 may be supported by a floor 42 of the vehicle 22, e.g., the frame may be fixed to the floor 42 with one or more fasteners, etc.

The seat 38 may have a vehicle inboard side 44 and a vehicle outboard side 46. The vehicle inboard side 44 and the vehicle outboard side 46 are spaced from each other. In other words, the vehicle inboard side 44 and the vehicle outboard side 46 may be opposite each other relative to the seat 38 and along the cross-vehicle axis A2. The vehicle inboard side 44 may be closer to the centerline CL of the vehicle 22 than the vehicle outboard side 46. In other words, a distance from the centerline CL to the vehicle inboard side 44 may be less than a distance from the centerline CL to the vehicle outboard side 46.

The armrest 24 provides support to the occupant/operator, e.g., the occupant/operator may lean or rest on the armrest 24. The armrest 24 may be cuboid, or any suitable shape. The armrest 24 may define a cavity 48, e.g., between a top 50, a bottom 52, a front 54, a back 56, and/or sides 58 of the armrest 24. The front 54 of the armrest 24 may include an opening 60. The opening 60 may provide access to the cavity 48. The armrest 24 may be plastic, metal, or any suitable material. The armrest 24 may be positioned along the cross-vehicle axis A2 relative to the seat 38. In other words, the armrest 24 and the seat 38 may be a same distance from the front of the vehicle 22. The armrest 24 may be located at the vehicle inboard side 44 of the seat 38. For example, the armrest 24 may be between the seats 38 of the vehicle 22, the armrest 24 may be at the centerline CL, etc. As another example, the armrest 24 may be part of a center console of the vehicle 22. The armrest 24 may be supported by the floor 42. For example, the armrest 24 may be fixed to the floor 42 with one or more fasteners, etc. The armrest 24 may be supported by the seat 38. For example, the armrest 24 may be fixed to the frame of the seat 38 with one or more fasteners, etc.

Figure 2:
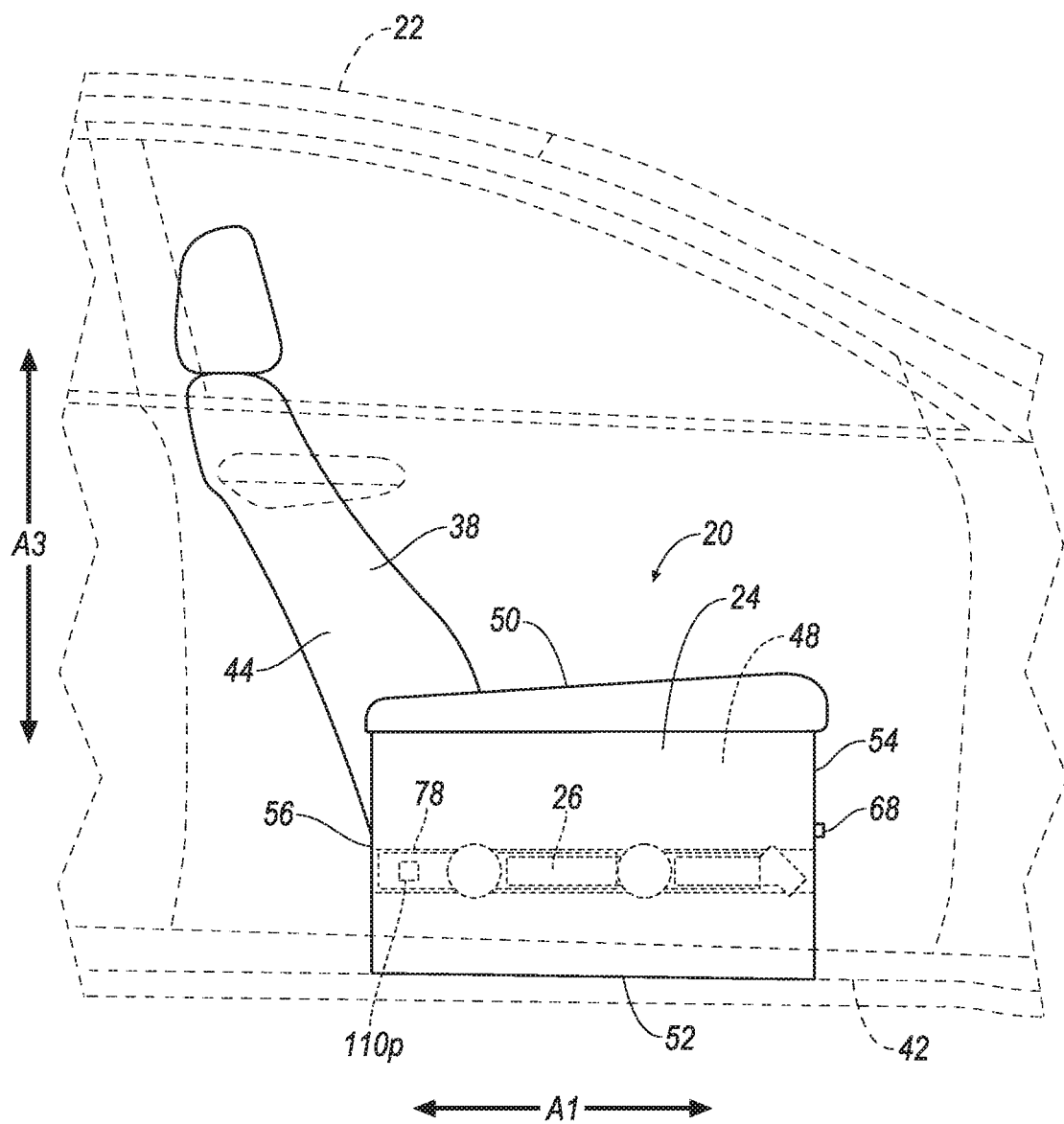
FIG. 2 is a side view of the vehicle having the stowable user interface system in the retracted position.
Figure 3:
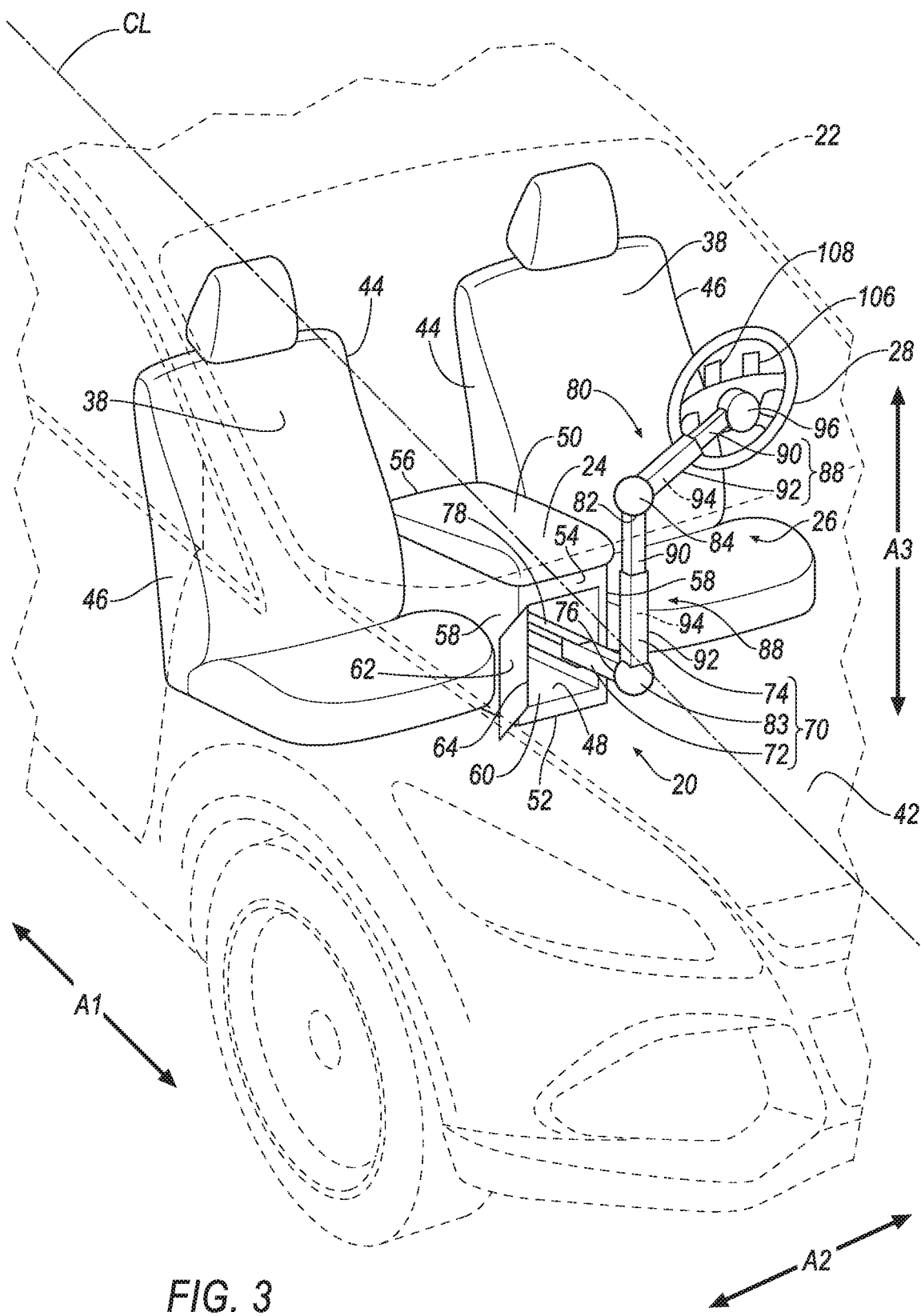
FIG. 3 is a perspective view of the vehicle having the stowable user interface system in an extended position.
Figure 4:
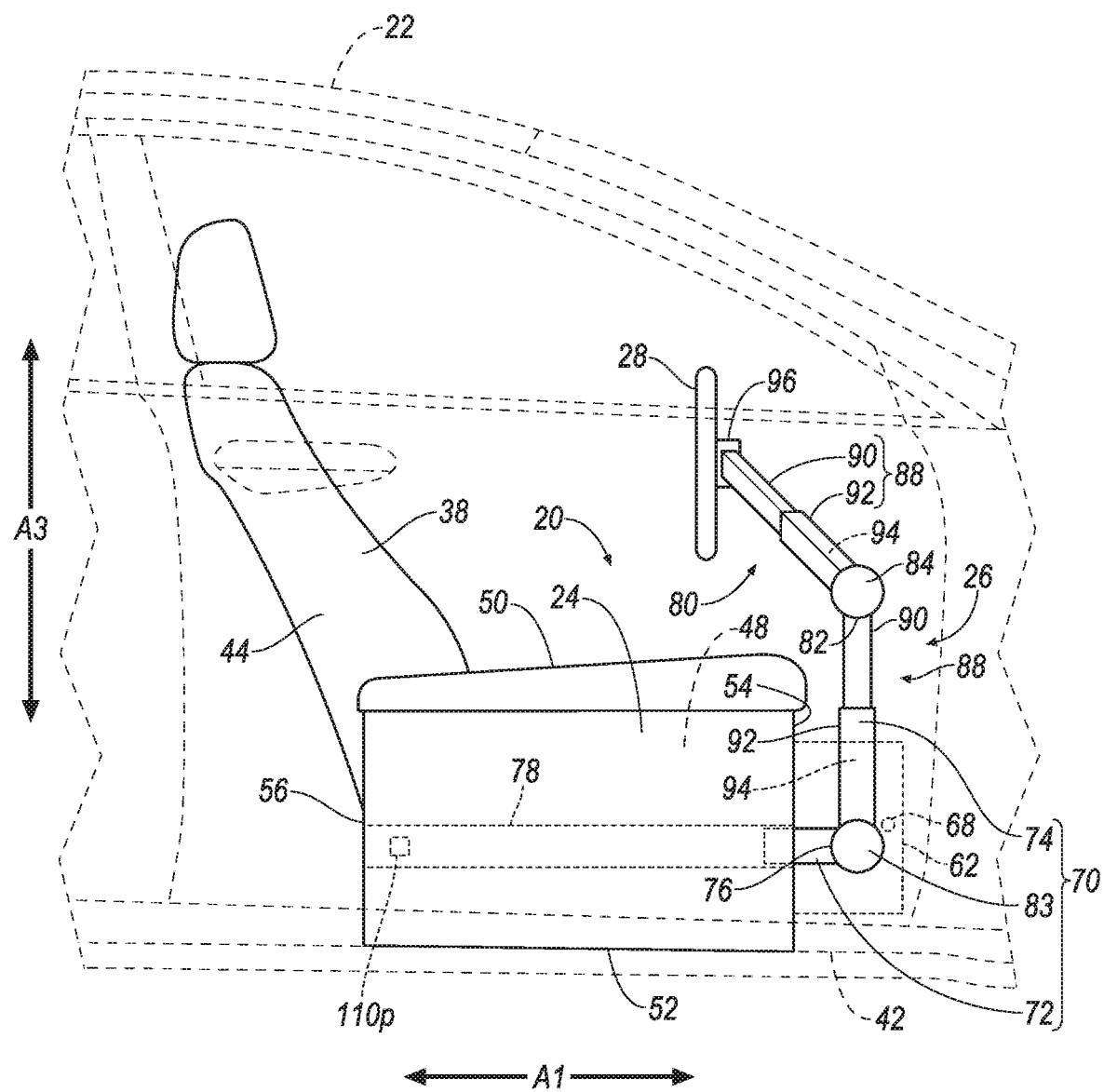
FIG. 4 is a side view of the vehicle having the stowable user interface system in the extended position.

The armrest 24 may include a panel 62 movable between a closed position, shown in FIGS. 1 and 2, and an open position, shown in FIGS. 3 and 4. The panel 62 in the closed position inhibits the steering wheel support arm 26 from moving from the retracted position to the extended position. For example, the panel 62 in the closed position may extend along the cross-vehicle axis A2 and the vertical axis A3, and may be positioned to restrict access to the cavity 48. In other words, the panel 62 in the closed position may extend across the opening 60. The panel 62 in the open position permits the steering wheel support arm 26 to move from the retracted position to the extended position. For example, the panel 62 in the open position may extend along the longitudinal axis A1 and the vertical axis A3, and may be positioned to allow access to the cavity 48. In other words, the panel 62 in the open position may not extend across the opening 60.

The panel 62 may be supported by the sides 58, the top 50, the bottom 52, the front 54, etc., of the armrest 24. For example, the panel 62 may be supported by a hinge 64. The panel 62 may pivot about the hinge 64 between the closed position and the open position. Other structures, e.g., tracks, etc., may be used to support the panel 62 and permit movement between the closed position and the open position. The occupant/operator may move the panel 62 between the closed position and the open position. Additionally or alternatively, the stowable user interface system 20 may include an actuator, e.g., a linear actuator, a rack and pinion, a servo motor, etc., configured to move the panel 62 between the closed position and the open position, e.g., in response to receiving a command from a computer 66.

The stowable user interface system 20 may include a lock 68. The lock 68 may be moveable between a locked state and an unlocked state. The lock 68 in the locked state inhibits the panel 62 from moving from the closed position to the open position. The lock 68 in the unlocked state permits the panel 62 to move from the closed position to the open position. For example, the lock 68 may be secured to the panel 62 and may include a latch that engages the armrest 24 in the locked state. For example, the armrest may include a slot, and the lock 68 in the locked state may operatively engage the slot. Additional or alternative features may be included in the lock 68 to provide the locked and unlocked states. The lock 68 may include circuits, chips, actuators, etc., configured to move the lock 68 from the locked state to the unlocked state, e.g., in response to a command from the computer 66. The lock 68 may transmit a message to the computer 66 indicating whether the lock 68 is in the locked state or the unlocked state.

The steering wheel support arm 26 supports the steering wheel 28, e.g., when the steering wheel 28 is connected to the steering wheel support arm 26. The steering wheel support arm 26 supports the steering wheel 28 such that the operator of the vehicle 22 may interact with the steering wheel 28 to control the steering system 34 of the vehicle 22, e.g., when the steering wheel support arm 26 is in the extended position and the steering wheel 28 is connected to the steering wheel support arm 26. In other words, the steering wheel support arm 26 supports the steering wheel 28 in a position where the operator may turn the steering wheel 28, e.g., the steering wheel 28 may be supported in front of one of the seats 38. The steering wheel support arm 26 may be metal, plastic, or any suitable material.

The steering wheel support arm 26 may include a base 70. The base 70 may include a longitudinal portion 72, e.g., elongated along the longitudinal axis A1. The base 70 may include a first extension 74, e.g., extending from a distal end 76 of the longitudinal portion 72. The distal end 76 may be at a front of the longitudinal portion 72, e.g., relative to the seat 38, relative to the front of the vehicle 22, etc. The first extension 74 may pivot relative to the longitudinal portion 72, e.g., about a hinge 83. The base 70 may be supported by the armrest 24, e.g., the longitudinal portion 72 may be supported by the side 58 of the armrest 24 via a track 78 (described below).

The steering wheel support arm 26 may include a second extension 80. The second extension 80 extends from the base 70. For example, second extension 80 may extend from a distal end 82 of the first extension 74 of the base 70. The second extension 80 may be pivotally supported by the base 70, e.g., via a hinge 84. The second extension 80 may pivot between a first position and a second position, e.g., about the hinge 84. In the first position the second extension 80 may be parallel with the first extension 74 of the base 70. In the second position the second extension 80 may extend transversely from the base 70, e.g., toward a center of the seat 38 between the sides 44, 46 of the seat 38. The second extension 80 may be temporarily fixed in the first position or the second position. For example, the hinge 84 and/or base 70 may include holes, and the hinge 84 and/or second extension 80 may include a spring-loaded pin that engages the one of the holes when the second extension 80 is in the first position or the second position. The pin may be depressed, e.g., by an occupant/operator of the vehicle 22, to disengage the pin from respective hole and move the second extension 80 from the first position to the second position, or vice versa. As another example, the hinge 84, the base 70, and or the second extension 80 may include an actuator, e.g., servo, etc., arranged to move the second extension 80 between the first position and the second position, e.g., in response to an instruction from the computer 66 received via an in-vehicle communication network 86. The adjectives "first" and "second" are used throughout this document as identifiers and are not intended to signify importance or order.

The base 70 and/or the second extension 80 may each include a telescoping member 88. Each telescoping member 88 may include a first portion 90 and a second portion 92. The first portions 90 may be moveable relative to the second portions 92 between extended positions, shown in FIGS. 3 and 4, and collapsed positions, shown in FIGS. 1 and 2. For example, the second portions 92 may each define a passage 94, and the first portions 90 may be slidably supported in the respective passage 94. In other words, the first portions 90 may slide within the respective passage 94 relative to the second portions 92 between the extended positions and the collapsed positions. Each telescoping member 88 may be temporarily fixed in the extended position or the collapsed position. For example, each second portion 92 may include a hole at opposite ends of the second portion 92, and each first portion 90 may include a spring-loaded pin that engages the respective hole when the telescoping member 88 is in the extended position or the collapsed position. The pin may be depressed, e.g., by the occupant/operator of the vehicle 22, to disengage the pin from respective hole and move the telescoping member 88 from the extended position to the collapsed position, or vice versa. As another example, each telescoping member 88 may include a linear actuator, e.g., a screw type including a threaded shaft and hole, a hydraulic type including a piston and cylinder, a rack and pinion, etc., arranged to move the respective telescoping member 88 between the extended position and the collapsed position, e.g., in response to an instruction from the computer 66 received via the in-vehicle communication network 86. For example, one end of the linear actuator may be fixed the first portion 90 and another end of the linear actuator may be fixed to the second portion 92.

The steering wheel support arm 26 is movable between an extended position, shown in FIGS. 3 and 4, and a retracted position, shown in FIGS. 1 and 2. The steering wheel support arm 26 may be slidable along the armrest 24 between the extended position and the retracted position. For example, the steering wheel support arm 26 may be slidably supported by the track 78. The track 78 may be fixed to the side 58 of the armrest 24 and inside the cavity 48. For example, the longitudinal portion 72 of the base 70 may include a roller engaged with the track 78. Other structures may slidably support the steering wheel support arm 26 on the armrest 24, e.g., via rails, grooves, etc. The steering wheel support arm 26 may slide along the track 78 between the extended position and the retracted position, e.g., through the opening 60 in the front 54 of the armrest 24. Alternately or additionally, the steering wheel support arm 26 may pivot, bend, etc., relative to the armrest 24 to move between the extended position and the retracted position.

The steering wheel support arm 26 in the extended position is outside the armrest 24. For example, in the extended position the longitudinal portion 72 of the base 70 may extend from within to outside the cavity 48, e.g., through the opening 60, and the first extension 74 of the base 70 may be completely outside the cavity 48. As another example, in the extended position the second extension 80 of the base 70 may be completely outside the cavity 48. The steering wheel support arm 26 in the extended position may be in front of the seat 38. For example, in the extended position the longitudinal portion 72 of the base 70 may extend along the side 44 of the seat 38 to in front of the seat 38, the first extension 74 of the base 70 may be in front of the seat 38 and extend along the vertical axis A3, and the second extension 80 may extend in front of, and across, the seat 38, e.g., when the second extension 80 is in the second position.

The steering wheel support arm 26 in the retracted position is inside the armrest 24. For example, in the retracted position the base 70 may be completely inside the cavity 48. As another example, in the retracted position the second extension 80 may be completely inside the cavity 48.

The steering wheel support arm 26 may include a head unit 96. The head unit 96 supports the steering wheel 28. The head unit 96 may be fixed to the second extension 80, e.g., via fastener, welding, etc. The head unit 96 may include a rotatable shaft that supports the steering wheel 28, e.g., when the steering wheel 28 is connected to the steering wheel support arm 26. The head unit 96 may include a rotational position sensor configured to detect a rotational position of the shaft. The head unit 96 may include a motor configured to the rotate the shaft. For example, the motor may be operatively coupled to the shaft via belts, gears, etc. The shaft may include splines. The shaft may include an electrical connector, e.g., to communicate information with the steering wheel 28 when the steering wheel 28 is connected to the steering wheel support arm 26.

Rotation of the steering wheel 28 when the steering wheel 28 is connected to the steering wheel support arm 26 may cause the head unit 96 to send information to the computer 66 to actuate the steering system 34. For example, the rotational position sensor in the head unit 96 may detect a steering angle of the steering wheel 28 and transmit such position to the computer 66.

The steering wheel 28 may be supported by the steering wheel support arm. For example, releasably fixed to the steering wheel support arm 26. In other words, the steering wheel 28 may be connected to the steering wheel support arm 26 when the steering wheel 28 is supported by the steering wheel support arm 26, and may be disconnected from the steering wheel support arm 26 when the steering wheel 28 is not supported by the steering wheel support arm 59. The steering wheel 28 may go from connected to disconnected, and vice-versa, without damaging the steering wheel 28 or the steering wheel support arm 26. For example, the steering wheel 28 may include a passage. The passage may be configured to receive the rotatable shaft of the head unit 96, for example, the passage may include spines that engage with the splines of the rotatable shaft when the steering wheel 28 is connected to the steering wheel support arm 26. The steering wheel 28 may be releasably secured to the steering wheel 28 with removable fasteners, releasable clips, etc. The operator of the vehicle 22 may secure and release the steering wheel 28, e.g., by manipulating the fasteners, the clips, etc. The passage may include an electrical connector configured to operatively couple to the electrical connector of the shaft and transmit information therebetween, e.g., when the steering wheel 28 is connected to the steering wheel support arm 26.

The steering wheel 28 may include a throttle control interface 106 and/or a brake control interface 108. The throttle control interface 106 and brake control interface 108 may each include a paddle, a button, a joystick, etc. The throttle control interface 106 receives input from the operator of the vehicle 22 and transmits a command the to the computer 66 to actuate the propulsion system 30. The brake control interface 108 receives input from the operator of the vehicle 22 and transmits a command the to the computer 66 to actuate the brake system 32. Alternately, the throttle control interface 106 and/or the brake control interface 108 may be supported by the head unit 96.

The propulsion system 30 of the vehicle 22 can translate stored energy into motion of the vehicle 22. The propulsion system 30 may be an electric powertrain including batteries, an electric motor, and a transmission that transfers rotational motion to the wheels; a hybrid powertrain including elements of a conventional powertrain, e.g., an internal-combustion engine coupled to a transmission that transfers rotational motion to wheels, and the electric powertrain; or any other type of propulsion that utilizes stored electric power. The propulsion system 30 is in communication with and receives input from the computer 66 and/or from the operator. The operator may control the propulsion system 30 via an input device, e.g., the throttle control interface 106.

The brake system 32 resist the motion of the vehicle 22 to slow and/or stop the vehicle 22. The brake system 32 may be friction brakes such as disc brakes, drum brakes, band brakes, etc.; regenerative brakes; a parking brake; any other suitable type of brakes; or a combination. The brake system 32 can include an electronic control unit (ECU) or the like that actuates the brake system 32 to resist the motion of the vehicle 22. e.g., in response to a command from the computer 66 and/or from the operator. The operator may control the brake system 32 via an input device, e.g., the brake control interface 108.

The steering system 34 controls the steering angle of the wheels of the vehicle 22. The steering system 34 is in communication with and receives input from the steering wheel 28 and/or the computer 66. The steering system 34 may be a rack-and-pinion system with electric power-assisted steering system 34, a steer-by-wire system, as are both known in the art, or any other suitable system.

Sensors 110 may detect internal states of the vehicle 22. For example, wheel speed, wheel orientation, tire pressure, suspension travel, brake sensors, traction control sensors, and engine and transmission variables. The sensors 110 may detect the position or orientation of the vehicle 22. For example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 110 may detect the external world. For example, light measurement sensors, photometers, microphones, wind speed measurement sensors, radar sensors, scanning laser range finders, light detection and ranging (LIDAR) devices, and image processing sensors such as cameras. The sensors 110 may detect the position of the steering wheel support arm 26, e.g., a proximity sensor 110$p$ (shown in FIGS. 2 and 4) may be supported by the armrest 24 and positioned to detect when the steering wheel support arm 26 is in the extended position or the retracted position. For example, the proximity sensor 110$p$ may be positioned such that the steering wheel support arm 26 is detected by the proximity sensor 110$p$ when the steering wheel support arm 26 is in the retracted position, and not detected by the proximity sensor 110$p$ when the steering wheel support arm 26 is in the extended position.

Figure 5:
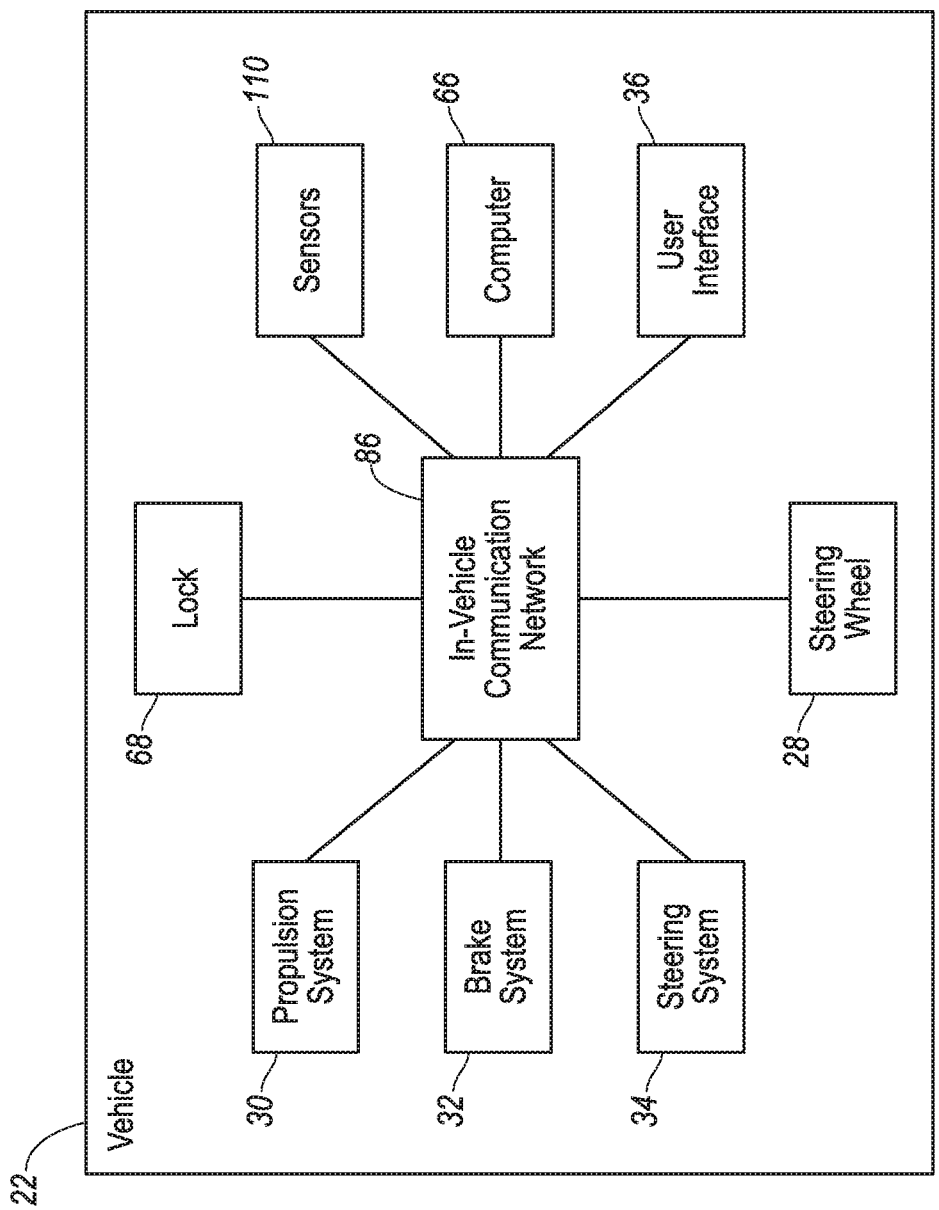
FIG. 5 is a block diagram illustrating components of the vehicle.

The vehicle 22 may include a vehicle user interface 36, shown in FIG. 5. The vehicle user interface 36 presents information to and receives information from the occupant/operator of the vehicle 22. The vehicle user interface 36 may be located, e.g., on the instrument panel in the passenger cabin of the vehicle 22, or wherever may be readily seen by the occupant/operator. The vehicle user interface 36 may include dials, digital readouts, screens, speakers, and so on for providing information to the occupant/operator, e.g., human-machine interface (HMI) elements such as are known. The vehicle user interface 36 may include buttons, knobs, keypads, a touchscreen, a microphone, and so on for receiving information from the occupant/operator.

The in-vehicle communication network 86 includes hardware such as a communication bus, for facilitating communication among components, e.g., between the propulsion system 30, the brake system 32, the steering system 34, the vehicle user interface 36, the computer 66, the head unit 96, the sensors 110, 110$p$, the steering wheel 28, etc. The in-vehicle communication network 86 may facilitate wired or wireless communication among the components in accordance with a number of communication protocols such as controller area network (CAN), Ethernet, Wi-Fi, Local Interconnect Network (LIN), and/or other wired or wireless mechanisms.

The computer 66, implemented via circuits, chips, antennas and/or other electronic components, is included in the vehicle 22 for carrying out various operations and processes, including those described herein. The computer 66 is a computing device that generally includes a processor and a memory, the memory including one or more forms of computer-readable media, and storing instructions executable by the processor for performing various operations and processes, including those disclosed herein. The computer 66 may be programmed by storing instructions on the memory that are executable by the processor.

The memory of the computer 66 further generally stores remote data received via various communications mechanisms; e.g., the computer 66 is generally configured for communications with components on the in-vehicle communication network 86. e.g., a controller area network (CAN) bus, and for using other wired or wireless protocols to communicate with devices outside the vehicle 22, e.g., with a user device, e.g., Universal Serial Bus (USB), Bluetooth®, IEEE 802.11 (colloquially referred to as WiFi®), satellite telecommunication protocols, and cellular protocols such as 3G, LTE, etc. Via the in-vehicle communication network 86 the computer 66 may transmit messages to various devices in the vehicle 22 and/or receive messages from the various devices, e.g., the propulsion system 30, the brake system 32, the steering system 34, the sensors 110, 110p, etc., e.g., as discussed herein. Although one computer 66 is shown for ease of illustration, it is to be understood that the computer 66 could include, and various operations described herein could be carried out by, one or more computing devices.

The computer 66 may be programmed to actuate the lock 68 from the locked state to the unlocked state, and vice versa. For example, the computer 66 may transmit commands to the lock 68, e.g., via the in-vehicle communication network 86, instructing actuation of the lock 68 to the locked state or the unlocked state.

The computer 66 may actuate the lock 68 from the locked state to the unlocked state, e.g., to permit the panel 62 to move to the open position, upon receiving a request to operate in one of the semi-autonomous mode and the manual mode. The request to operate the vehicle 22 in the manual mode or the semiautonomous mode may be received from the vehicle user interface 36, the user device, etc.

The computer 66 may be programmed to determine whether the steering wheel support arm 26 is in the extended position or the retracted position. For example, the computer 66 may determine whether the steering wheel support arm 26 is in the extended position or the retracted position based on information from the proximity sensor 110p. The computer 66 may receive information from the proximity sensor 110p, e.g., via the in-vehicle communication network 86, indicating that the steering wheel support arm 26 is detected or not detected. The computer 66 may determine the steering wheel support arm 26 is in the extended position when the steering wheel support arm 26 is not detected by the proximity sensor 110p. The computer 66 may determine the steering wheel support arm 26 is in the retracted position when the steering wheel support arm 26 is detected by the proximity sensor 110p.

The computer 66 may be programmed to operate the vehicle 22 in the autonomous mode. In other words, the computer 66 may be programmed to actuate the steering system 34, the propulsion system 30, and/or the brake system 32 without receiving a command from the steering wheel 28. The computer 66 may operate in the autonomous mode based on information from the sensors 110, etc., e.g., received via the in-vehicle communication network 86.

The computer 66 may be programmed to operate in the autonomous mode upon determining the steering wheel support arm 26 is in the retracted position. For example, the computer 66 may control the steering system 34, the brake system 32, and the propulsion system 30, e.g., based on information from the sensors 110, in response to the determining the steering wheel support arm 26 is in the retracted position, e.g., based on information from the proximity sensor 110p detecting the steering wheel support arm 26.

The computer 66 may be programmed to operate the vehicle 22 in the semi-autonomous mode or the manual mode. In other words, the computer 66 may be programmed to actuate the steering system 34, the propulsion system 30, and/or the brake system 32 in response to a receiving command from the steering wheel 28, e.g., when the steering wheel 28 is connected to the steering wheel support arm 26 and transmitted via the in-vehicle communication network 86. Based on such command, the computer 66 may transmit a command instructing actuation to the propulsion system 30, the braking system, and/or the steering system 34, e.g., via the in-vehicle communication network 86.

The computer 66 may be programmed to operate in one of the semi-autonomous mode and the manual mode upon determining the steering wheel support arm 26 is in the extended position. For example, the computer 66 may permit operator control of one or more of the steering system 34, the brake system 32, and the propulsion system 30, e.g., based on information from the steering wheel 28, in response to the determining the steering wheel support arm 26 is in the extended position, e.g., based on information from the proximity sensor 110p not detecting the steering wheel support arm 26.

Figure 6:
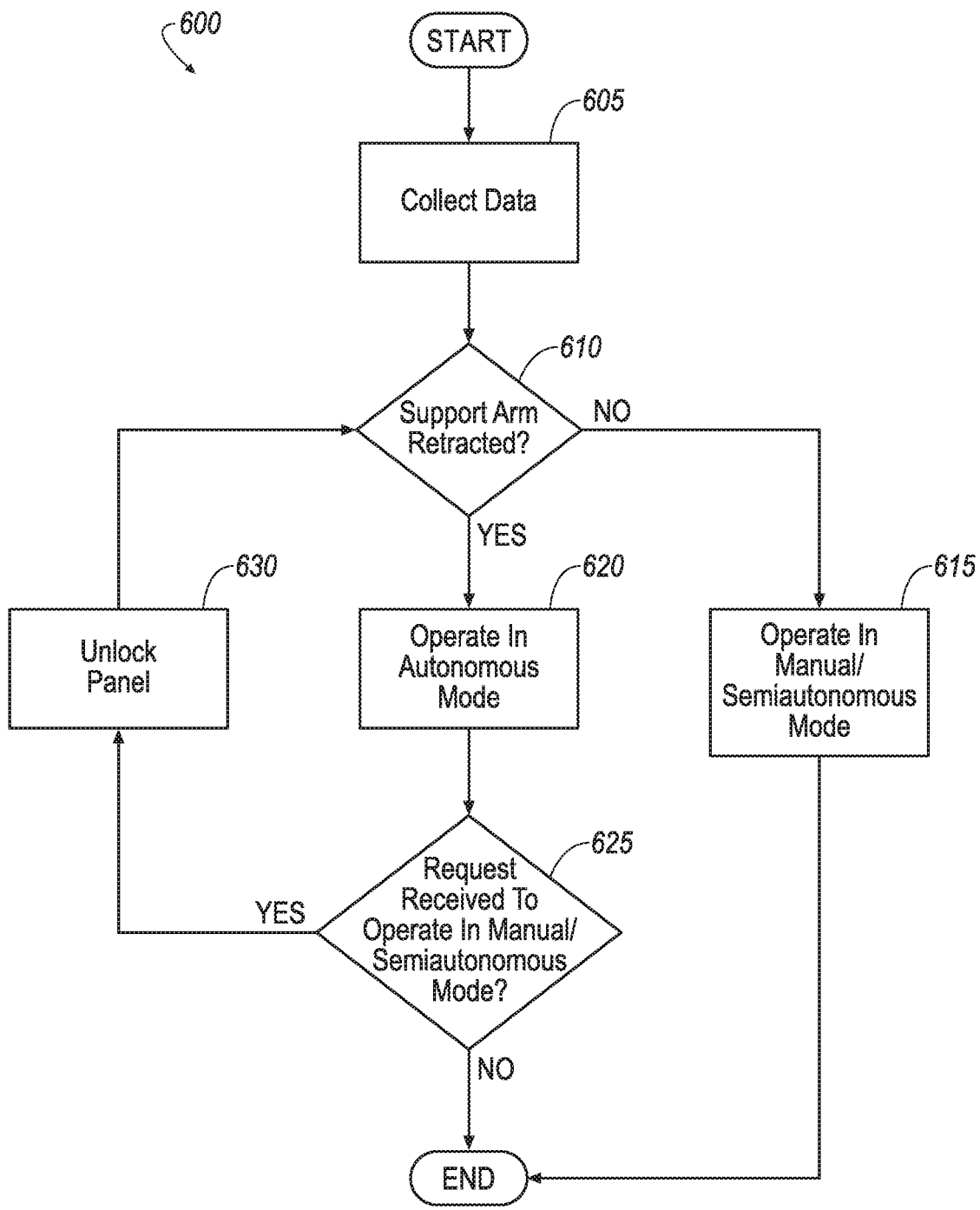
FIG. 6 is a flow chart illustrating a process for controlling the vehicle having the stowable user interface system.

FIG. 6 is a process flow diagram illustrating an exemplary process 600 for operating the vehicle 22 having the stowable user interface system 20. The process 600 may be executed according to instructions stored in and executable by the computer 66.

The process 600 begins in a block 605 in which the computer 66 receives data, e.g., from the sensors 110, 110p, the steering wheel 28, the user interface 36, etc., e.g., via the in-vehicle communication network 86. The computer 66 may continue to receive data throughout the process 600. Throughout the process 600 in the present context means substantially continuously or at time intervals, e.g., every 200 milliseconds.

Next, at a block 610 the computer 66 determines whether the steering wheel support arm 26 is in the retracted position, e.g., based on information from the proximity sensor 110p. Upon determining the steering wheel support arm 26 is not in the retracted position, e.g., that the steering wheel support arm 26 is in the extended position, the process 600 moves to a block 615. Upon determining the steering wheel support arm 26 is in the retracted position the process 600 moves to a block 620.

At the block 615 the computer 66 operates the vehicle 22 in the manual mode or the semiautonomous mode. After the block 615 the process 600 may end. Alternately, the process 600 may return to the block 605.

At the block 620 the computer 66 operates the vehicle 22 in the autonomous mode.

At a block 625 the computer 66 determines whether a request to operate the vehicle 22 in the manual mode or the semiautonomous mode has been received, e.g., from the user interface 36. Upon determining that such request has been received the process 600 moves to a block 630. Upon determining that such request has not been received the process 600 may end. Alternately, the process 600 may return to the block 605.

At the block 630 the computer unlocks the panel 62, e.g., by sending a command to the lock 68 instructing actuation to the unlocked state. After the block 630 the process 600 may return to the block 610.

Computing devices, such as the computer 66, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   an armrest; and
   a steering wheel support arm supported by the armrest and movable between an extended position outside the armrest and a retracted position inside the armrest, the steering wheel support arm including a base slidable relative to the armrest and an extension pivotally supported by the base.

2. The system of claim 1, further comprising a steering wheel supported by the steering wheel support arm.

3. The system of claim 1, wherein the base includes a telescoping member.

4. The system of claim 1, wherein the extension includes a telescoping member.

5. The system of claim 1, further comprising a track supported within the armrest, the base slidable along the track.

6. The system of claim 1, wherein the base includes a longitudinal portion and a second extension pivotable relative to the longitudinal portion, and wherein the extension is pivotable relative to the second extension.

7. The system of claim 6, wherein the extension includes a telescoping member and the second extension includes a second telescoping member.

8. The system of claim 1, wherein the armrest includes a panel movable between a closed position in which the steering wheel support arm is inhibited from moving from the retracted position to the extended position and an open position in which the steering wheel support arm is permitted to move from the retracted position to the extended position.

9. The system of claim 8, further comprising a lock moveable between a locked state in which the panel is inhibited from moving from the closed position to the open position and an unlocked state in which the panel is permitted to move from the closed position to the open position.

10. A vehicle comprising:
    a seat;
    an armrest positioned along a cross-vehicle axis relative to the seat;
    a steering wheel support arm supported by the armrest and movable between an extended position outside the armrest and a retracted position inside the armrest;
    a processor; and
    a memory storing instructions executable by the processor to determine whether the steering wheel support arm is in the extended position or the retracted position, the memory further storing instructions executable by the processor to operate in an autonomous mode upon determining the steering wheel support arm is in the retracted position.

11. The vehicle of claim 10, wherein the memory stores instructions executable by the processor to operate in one of a semi-autonomous mode and a manual mode upon determining the steering wheel support arm is in the extended position.

12. The vehicle of claim 10, wherein the memory stores instructions executable by the processor to determine whether the steering wheel support arm is in the extended position or the retracted position based on information from a proximity sensor.

13. The vehicle of claim 10, further comprising a floor, the armrest supported by the floor.

14. The vehicle of claim 10, wherein the steering wheel support arm in the extended position is in front of the seat.

15. The vehicle of claim 10, wherein the armrest is located at a vehicle inboard side of the seat.

16. The vehicle of claim 10, wherein the armrest is supported by the seat.

17. The vehicle of claim 10, wherein the armrest includes a panel movable between a closed position in which the steering wheel support arm is inhibited from moving from the retracted position to the extended position and an open position in which the steering wheel support arm is permitted to move from the retracted position to the extended position.

18. The vehicle of claim 17, further comprising a lock moveable between a locked state in which the panel is inhibited from moving from the closed position to the open position and an unlocked state in which the panel is permitted to move from the closed position to the open position.

19. The vehicle of claim 18, further comprising a processor and a memory storing instructions executable by the processor to actuate the lock from the locked state to the unlocked state upon receiving a request to operate in one of a semi-autonomous mode and a manual mode.

20. A vehicle comprising:
a seat;
an armrest positioned along a cross-vehicle axis relative to the seat;
a steering wheel support arm supported by the armrest and movable between an extended position outside the armrest and a retracted position inside the armrest;
the armrest includes a panel movable between a closed position in which the steering wheel support arm is inhibited from moving from the retracted position to the extended position and an open position in which the steering wheel support arm is permitted to move from the retracted position to the extended position;
a lock moveable between a locked state in which the panel is inhibited from moving from the closed position to the open position and an unlocked state in which the panel is permitted to move from the closed position to the open position; and
a processor and a memory storing instructions executable by the processor to actuate the lock from the locked state to the unlocked state upon receiving a request to operate in one of a semi-autonomous mode and a manual mode.

* * * * *